US006317975B1

(12) United States Patent
Asada et al.

(10) Patent No.: US 6,317,975 B1
(45) Date of Patent: Nov. 20, 2001

(54) METHOD OF MANUFACTURING COMMON RAILS

(75) Inventors: Kikuo Asada, Mishima; Ryuichi Kusanagi, Numazu, both of (JP)

(73) Assignee: Usui Kokusai Sangyo Kaisha Limited (JP)

( * ) Notice: Subject to any disclaimer, the term of this patent is extended or adjusted under 35 U.S.C. 154(b) by 0 days.

(21) Appl. No.: 09/499,838

(22) Filed: Feb. 7, 2000

(30) Foreign Application Priority Data

Feb. 17, 1999 (JP) ................................................ 11-038650

(51) Int. Cl.[7] ..................................................... B23P 15/00

(52) U.S. Cl. ................................. 29/888.01; 29/890.124; 29/890.126

(58) Field of Search ...................... 29/890.124, 890.126, 29/888.01; 285/189, 197; 123/468, 469, 470

(56) References Cited

U.S. PATENT DOCUMENTS 3,981,061 * 9/1976 Jackson et al. ........................ 29/464
4,179,141 * 12/1979 Newman ............................. 285/189
4,832,376 * 5/1989 Sugao .................................. 285/158
4,893,601 * 1/1990 Sugao .................................. 123/468
4,900,180 * 2/1990 Takikawa ............................. 403/233
5,143,410 * 9/1992 Takikawa ............................. 285/197
5,169,182 * 12/1992 Hashimoto ........................ 285/332.2
5,172,939 * 12/1992 Hashimoto ............................. 285/24
5,261,705 * 11/1993 Takahashi et al. ................... 285/197
5,667,255 * 9/1997 Kato ................................ 285/133.4
5,903,964 * 5/1999 Uematsu et al. ................ 29/890.142
5,937,520 * 8/1999 Earhart et al. .................... 29/890.13
5,957,507 * 9/1999 Asada .................................. 285/189
6,050,611 * 4/2000 Asada ............................... 285/133.4
6,126,208 * 10/2000 Asada et al. ...................... 285/133.4

* cited by examiner

*Primary Examiner*—I Cuda Rosenbaum
(74) *Attorney, Agent, or Firm*—Anthony J. Casella; Gerald E. Hespos

(57) ABSTRACT

A method is provided for manufacturing common rails, such as a high-pressure fluid manifold or a block rail that may be use in an accumulator fluid injection system. The method includes providing a main tubular rail with a flow passage extending in an axial direction. A bottomed lower hole is formed generally transverse to the axial flow passage. A pressing force is applied to the bottomed lower hole to generate a residual compressive stress in a circumferential part of the end portion of the bottom hole. The bottom lower hole then is made to communicate with the flow passage in the main rail. Defects that may have been caused by the application of the pressing force then are cut off. The removal of the defects improves an internal pressure fatigue strength, achieves high durability and ensures freedom from leakage.

19 Claims, 9 Drawing Sheets

PROIR ART

PROIR ART

METHOD OF MANUFACTURING COMMON RAILS

BACKGROUND OF THE INVENTION

1. Field of the Invention

This invention relates to a method of manufacturing a common rail, such as a high-pressure fuel manifold or a block rail used generally in an accumulator fuel injection system for a diesel internal combustion engine.

2. Description of the Related Art

A known common rail is shown, for example, in FIG. 7, and includes a main tubular rail 11 made of a cross-sectionally circular pipe. Plural bosses 11-4 are provided on an axially extending wall of the rail 11 so that the bosses are spaced from one another. A branch hole 11-2 is formed in each of the bosses 11-4, and communicates with a flow passage 11-1 in the main tubular rail 11. Each branch hole 11-2 has a pressure receiving seat surface 11-3 that is opened outward. A branch pipe 12 is fitted in the branch hole. The branch pipe 12 has a joint head 12-2 with a pressure seat surface 12-3 that is engaged with the pressure receiving seat surface 11-3 of the main tubular rail 11. An external tightening screw type nut 13 is fitted around the branch pipe 12 in advance. The nut 13 is screwed into the relative boss 11-4 to fasten and join the branch pipe 12 to the main tubular rail 11 by pressure of the nut 13 exerted on a bent surface of a neck portion of the joint head 12-2. Referring to FIG. 7, reference numeral 12-1 denotes a flow passage in the branch pipe 12, and 14 denotes a tightening sleeve washer.

The common rail shown in FIG. 7 has the branch hole 11-2 formed in the boss 11-4 that is integral with the main tubular rail 11. Thus, a large tensile stress occurs in an inner circumferential portion P of a lower end of the branch hole 11-2 due to an internal pressure of the main tubular rail 11, and an axial force is exerted on the pressure receiving seat surface 11-3 when the joint head 12-2 of the branch pipe 12 is pressed. Consequently, cracks starting from the inner circumferential portion P of the lower end readily occur, and there is the possibility that leakage of fluid occurs.

To solve such problems, the inventor of the present invention previously proposed a common rail capable of reducing a maximum value of the stress occurring in the inner circumferential portion of the lower end of the branch hole, and thereby improving the internal pressure fatigue strength thereof. One version of this previously proposed common rail includes a main tubular rail having therein an axially extending flow passage. At least one boss is formed on an axially extending circumferential wall of the main tubular rail so as to be integral therewith. A branch hole is formed in the boss and has a pressure receiving seat surface communicating with the flow passage and opened outward. A branch pipe is fitted in the branch hole and has a flow passage communicating with the flow passage in the rail. A pressure seat surface is formed on a joint head at an end portion of the branch pipe, and is engaged with the pressure receiving seat surface. A tightening nut is fitted around the branch pipe in advance. The nut then is screwed into the boss to fasten and join the branch pipe to the main tubular pipe by a pressure occurring due to the screwing force and exerted on a bent surface of a neck portion of the joint head.

An alternate proposal for a common rail included a main tubular rail having therein an axially extending flow passage. At least one branch hole is provided in an axially extending circumferential wall of the main tubular rail. A branch pipe is joined to a circumferential surface portion of the branch hole and has a flow passage communicating with the flow passage of the rail. An outwardly opened pressure receiving surface of the branch hole is engaged with the pressure seat surface on the joint head at the end portion of the branch pipe. A separately formed metal joint is fixed to the main tubular rail. A tightening nut is fitted around the branch pipe in advance, and the metal joint and tightening nut are screwed on each other to press a bent surface of a neck portion of the joint head. Thus, the branch pipe and main tubular rail are fastened and joined to each other.

A second alternate proposal for a common rail included a block rail having a flow passage in an axially extending inner portion. At least one joint hollow is provided in an axially extending circumferential wall of the block rail. A branch hole is provided in the joint hollow. The branch hollow communicates with the flow passage and has an outwardly opened pressure receiving seat surface. A branch pipe is inserted in the branch hole, and has therein a flow passage communicating with the flow passage in the block rail. A pressure seat surface is formed on a joint head provided at an end portion of the branch pipe, and is engaged with the pressure receiving seat surface. A tightening nut is fitted around the branch pipe in advance. The joint hollow and tightening nut are screwed on each other to press a bent surface of a neck portion of the joint head. Thus, the branch pipe and block rail are fastened and joined to each other.

In all of these previously proposed common rails, residual compressive stress is made to exist in a circumferential part of the end portion of the branch pipe which is opened into the flow passage in the main tubular rail or block rail. Thus, stress, which occurs in the inner circumferential part P of a lower end of the branch hole due to the internal pressure of the main tubular rail or block rail and an axial force exerted on the pressure receiving seat surface when the joint head of the branch pipe is pressed, is offset by the residual compressive stress. Thus, a maximum value of the tensile stress occurring in the inner circumferential part P of the lower end of the branch hole is lowered.

The methods of generating and leaving residual compressive stress in the circumferential part of the end portion of the branch pipe which is opened into the flow passage in the main tubular rail or block rail in these common rails include: a method of applying a pressing force to the interior of the flow passage in the main tubular rail or block rail from the outside by a pressing system; a system for applying a pressure to the interior of the main tubular rail or block rail; a pipe expansion system for applying a pressure from the interior of the main tubular rail or a block rail in the radial direction thereof; or a pipe expansion system for applying a pressure from the interior of the branch hole in the radial direction thereof. One method for forming a residual compressive stress includes the steps of forming a bottomed lower hole 11-2' in a boss 11-4 integral with a main tubular rail. The method proceeds by applying a pressing force into the lower hole 11-2' from the outside in the axial direction of the boss by an external pressure system using a punch 15. The punch 15 generates residual compressive stress in a circumferential part of the end portion of a branch hole 11-2 which is opened into a flow passage in the main tubular rail as shown, for example, in FIG.8.

However, a fine defect 16, such as a fine crack, occurs in some cases in a circumferential part of a bottom portion of the lower hole or in a circumferential part of a free end portion of the punch 15 by which a pressing force has been applied to the lower hole. The fine crack is due to tensile stress occurring in a bottom portion of the bottomed lower hole 11-2. FIG. 9 shows a method including the step of applying a pressing force from the outside to a bottomed lower hole 21-2' in a circumferential wall of a main tubular rail 21. The pressing force is applied by an external pressure system using a punch 25 to generate residual compressive stress in a circumferential part of the end portion of a branch hole 21-2 which is opened into a flow passage in the main tubular rail. However, a fine defect 26, such as fine crack, occurs in some cases in the circumferential part of the bottom portion of the lower hole or in a circumferential part of a free end portion of the punch 25 by which the pressing force has been applied to the lower hole. The fine crack is due to tensile stress occurring in the bottom portion of the bottomed lower hole 21-2'. The fine defect, described above, causes a decrease in the fatigue strength of the branch hole, and creates a fear of causing the breakage of the common rail. Therefore, it is necessary that the occurrence of the fine defect be prevented.

SUMMARY OF THE INVENTION

The present invention has been made in view of the above circumstances and provides a method of manufacturing common rails, capable of solving the problem of occurrence of a fine defect ascribed to a fine crack occurring in the mentioned lower hole, and improving an internal pressure fatigue strength thereof by lowering a maximum value of stress occurring in the branch hole, and free from a fine defect ascribed to a fine crack in the branch hole.

According to one aspect of the present invention, the method of manufacturing common rails has a step of forming at least one boss on an axially extending circumferential wall of a main tubular rail having a flow passage in an axially extending inner portion thereof. The method proceeds by forming in the boss a branch hole, which communicates with the mentioned flow passage and has an outwardly opened pressure receiving seat surface. The method provides a branch pipe with a flow passage and with a joint head at one end. The method includes a further step of engaging a pressure seat surface, which is formed on the joint head provided of the branch pipe with the pressure receiving seat surface. The method also includes screwing a tightening nut, which is fitted around the branch pipe in advance, into the boss to thereby fasten and join the branch pipe to the main tubular rail by a pressure occurring due to the screwing force that is exerted on a bent surface of a neck portion of the joint head. The method is further characterized by the steps of: forming in the boss in advance a bottomed lower hole for the branch hole; generating residual compressive stress in a circumferential part of the end portion of the branch hole which will be opened into the flow passage in the main tubular rail, by applying a pressing force from the outside to the lower hole in the axial direction of the boss by an external pressure system; and then cutting off a fine defect (a fine crack or a fine split) occurring in the lower hole.

According to another aspect of the present invention, the method of manufacturing common rails has a step of forming at least one branch hole in an axially extending circumferential wall of a main tubular rail having a flow passage in an axially extending inner portion thereof. The method also includes forming on an inner circumferential surface of the branch hole an outwardly opened pressure receiving surface to which a branch pipe having a flow passage is joined for communicating with the flow passage in the main tubular rail. The method then includes engaging a pressure seat surface on a joint head of the branch pipe with the pressure receiving seat surface. The method proceeds by screwing on each other a separately formed metal joint fixed to the main tubular rail and a tightening nut fitted around the branch pipe in advance. This latter step fastens and joins the branch pipe to the main tubular rail by a pressure occurring due to the screwing force and exerted on a bent surface of a neck portion of the joint head. The method is characterized further by the steps of: forming a bottomed lower hole in advance in the portion of the main tubular rail which is in the vicinity of the branch hole; generating residual compressive stress in a circumferential part of the end portion of the branch pipe which is opened into the main tubular rail by applying a pressing force from the outside to the lower hole in the axial direction thereof by an external pressure system; and then cutting off a fine defect (a fine split or a fine crack) occurring in the lower hole.

According to still another aspect of the present invention, the method of manufacturing common rails has a step of forming at least one joint hollow in an axially extending circumferential wall of a block rail having a flow passage in an axially extending inner portion thereof. The method also includes forming in the joint hollow a branch hole communicating with the flow passage and having a pressure receiving seat surface. The method further includes forming a pressure seat surface on a joint head provided at an end portion of a branch pipe having a flow passage. The method proceeds by engaging the pressure seat surface with the pressure receiving surface. The method continues by screwing a tightening nut, which is fitted around the branch pipe in advance, into the joint hollow for fastening and joining the branch pipe to the block rail by a pressure occurring due to the screwing force that is exerted on a bent surface of a neck portion of the joint head. The method is further characterized by the steps of: forming a bottomed lower hole in advance in the portion of the block rail which is in the vicinity of the branch hole; generating residual compressive stress in a circumferential part of the end portion of the branch pipe which is opened into the block rail, by applying a pressing force from the outside to the lower hole in the axial direction thereof by an external pressure system, and then cutting off a fine defect (a fine split or a fine crack) occurring in the lower hole.

The method step of generating and leaving residual compressive stress by applying a pressing force from the outside to a lower hole in the axial direction of the relative boss by a pressing system can, include the step of forming in the first place on a pre-processing stage (cutting stage) a bottomed lower hole in a boss of a main tubular rail by cutting an inner portion of the boss, for example, by an end mill. This step then may include pressing a bottom portion of the lower hole by using a punch or a rod with the main tubular rail, for example, a rail body fixed in a lower mold, or simultaneously carrying out such a pressing operation and punching a branch hole.

The method step of cutting off the fine defect occurring in the lower hole after this process has been carried out may include cutting a bottomed lower hole in a boss, in the case where the boss is made integral with the main tubular rail, to a larger diameter, for example, by an end mill so as to cut off a fine defect, and thereby forming a branch hole of a predetermined diameter. In the case of a separately formed boss, a fine defect can be cut off by forming an outwardly opened pressure receiving seat surface in a branch hole made in a main tubular rail itself, or the branch hole may be cut to a larger diameter as necessary.

According to the present invention described above, the occurrence of stress, when a high-pressure fuel is accumulated in a flow passage during the use of a common rail, in a circumferential part of the lower end of a branch hole which is opened into a main tubular rail or a block rail can be minimized effectively by generating residual compressive stress in the mentioned circumferential part. In addition, a normal branch hole having neither a fine split nor a fine crack in its inner circumferential surface is obtained by cutting off a fine defect occurring due to the application of residual compressive stress, and an internal pressure fatigue strength of a branch pipe-connected portion can be improved.

BRIEF DESCRIPTION OF THE DRAWINGS

Preferred embodiments of the present invention will be described in detail on the basis of the following figures, wherein.

DESCRIPTION OF THE PREFERRED EMBODIMENTS

Figure 1:
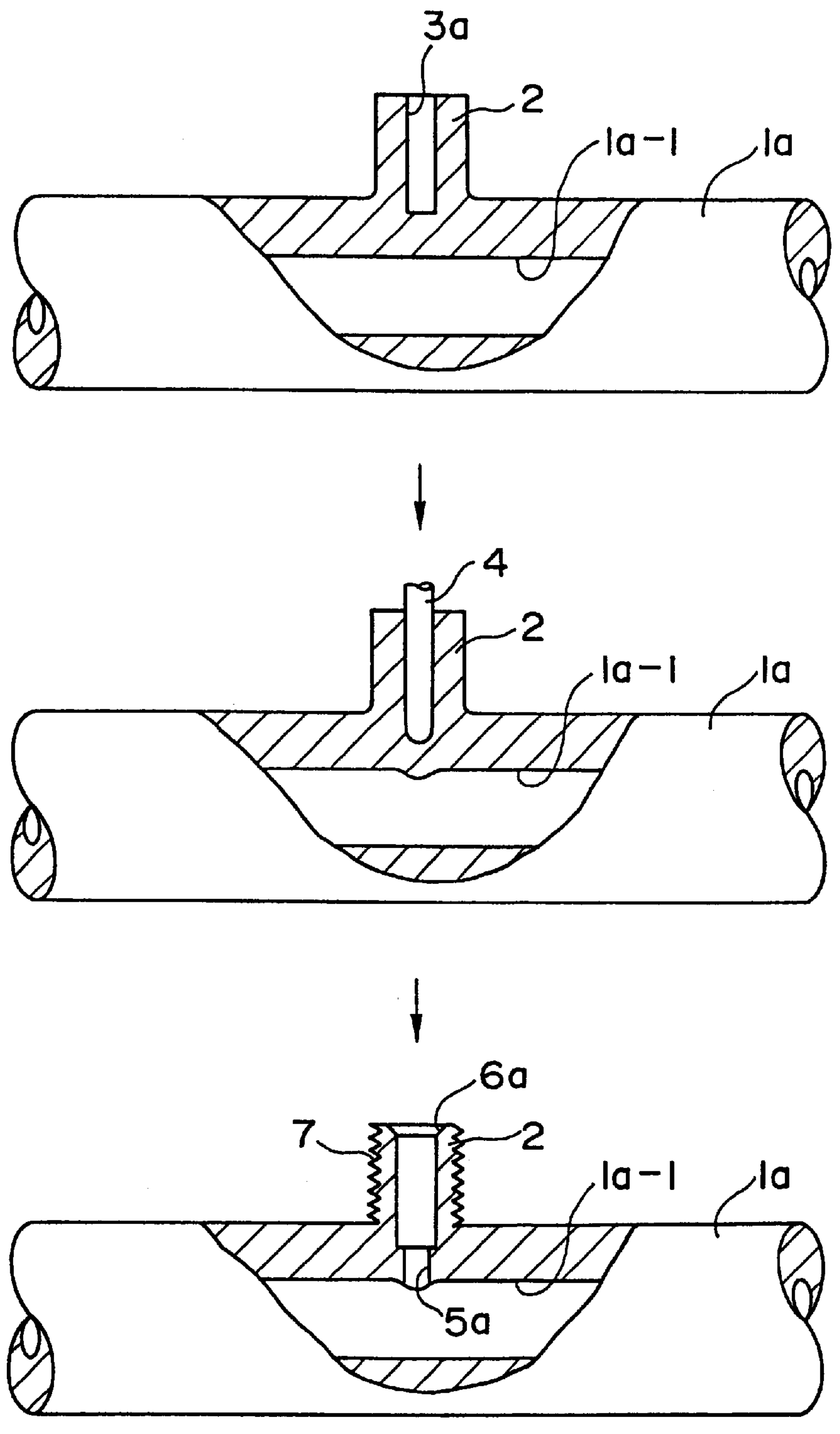
FIG. 1 is a partially cutoff schematic diagram showing an embodiment of the method of manufacturing a common rail having a boss integral with a main tubular rail according to the present invention.

Referring to FIGS. 1 to 6, reference numerals 1*a*, 1*b* denote a main tubular rail, 1*c* a block rail, 2 a boss, 3*a*, 3*b*, 3*c* bottomed lower holes, 4 a punch, 5*a*, 5*b*, 5*c* branch holes, 6*a*, 6*b*, 6*c* pressure receiving surface, 7 an outer thread, 8 an inner thread, 9 a ring-shaped metal joint (retainer), and 10 a cylindrical sleeve.

The main tubular pipes 1*a*, 1*b*, or common rails, are formed of a forged product or a stretched pipe member of a material S45C having a comparatively thick-walled tubular portion of, for example, 28 mm in diameter and 9 mm in wall thickness. Inner axial portions of the main tubular rails are subjected to a machining process using a boring gun drill, whereby flow passages 1*a*-1, 1*b*-1 are formed therein. The common rail of FIGS. 1 and 2 has at least one boss 2 integral with a main tubular rail 1*a*, such that the at least one boss 2 is on an axially extending circumferential wall thereof. A block rail 1*c* has a common rail formed of a forged product of a material S45C having a comparatively thick-walled tubular portion and a rectangular cross section of, for example, 80 mm in length and 50 mm in width. An inner axial portion of the cross-sectionally rectangular member is subjected to the formation of a flow passage 1*c*-1 therein in the same manner as the main tubular rail. Thus at least one joint hole is provided in a longitudinally extending circumferential wall thereof.

In the case of a common rail having a boss 2 integral with a main tubular rail 1*a*, a bottomed lower hole 3*a* of a suitable depth is formed first in the boss 2 of the main tubular rail 1*a* by cutting an inner portion of the boss 2, for example, by an end mill on a pre-processing stage (cutting stage) as shown in FIG. 1. The main tubular rail 1*a* then is fixed in a mold (not shown) on a pressing stage, and a pressing force is applied to an inner bottom portion of the boss 2 by a punch 4 fixed to a press. The punch 4 has a diameter slightly smaller than an inner diameter of the bottomed lower hole 3*a* in the boss 2. A level of the pressing force applied to the inner bottom portion during this time is not limited. However, it may be so high to permit the part of the inner circumferential surface of the flow passage 1*a*-1 in the main tubular rail just under the inner bottom portion of the boss to project slightly. More particularly, the pressing force of this punch 4 causes the inner circumferential surface of the flow passage 1*a*-1 to project slightly. The application of the pressing force to the inner bottom portion of the boss causes a plastically deformed portion and an elastically deformed portion to occur. Residual compressive stress occurs due to deformation ascribed to a difference in the quantities of return at the time of removal of the pressing force.

After the application of a pressing force of the punch 4 is carried out, a fine defect is cut off by cutting the bottomed lower hole 3*a* to a larger diameter by a drill having a diameter larger than the inner diameter of the bottomed lower hole 3*a*. Additionally a branch hole 5*a* is formed to communicate with the flow passage 1*a*-1 in the main tubular rail 1*a*, and a circular outwardly opened circumferential surface is formed to communicate with the flow passage 1*a*-1 and to serve as a pressure receiving surface. The external thread 7 also may be formed in an outer circumferential surface of the boss. However, the external thread 7 may also be formed earlier on the pre-processing stage.

Figure 2:
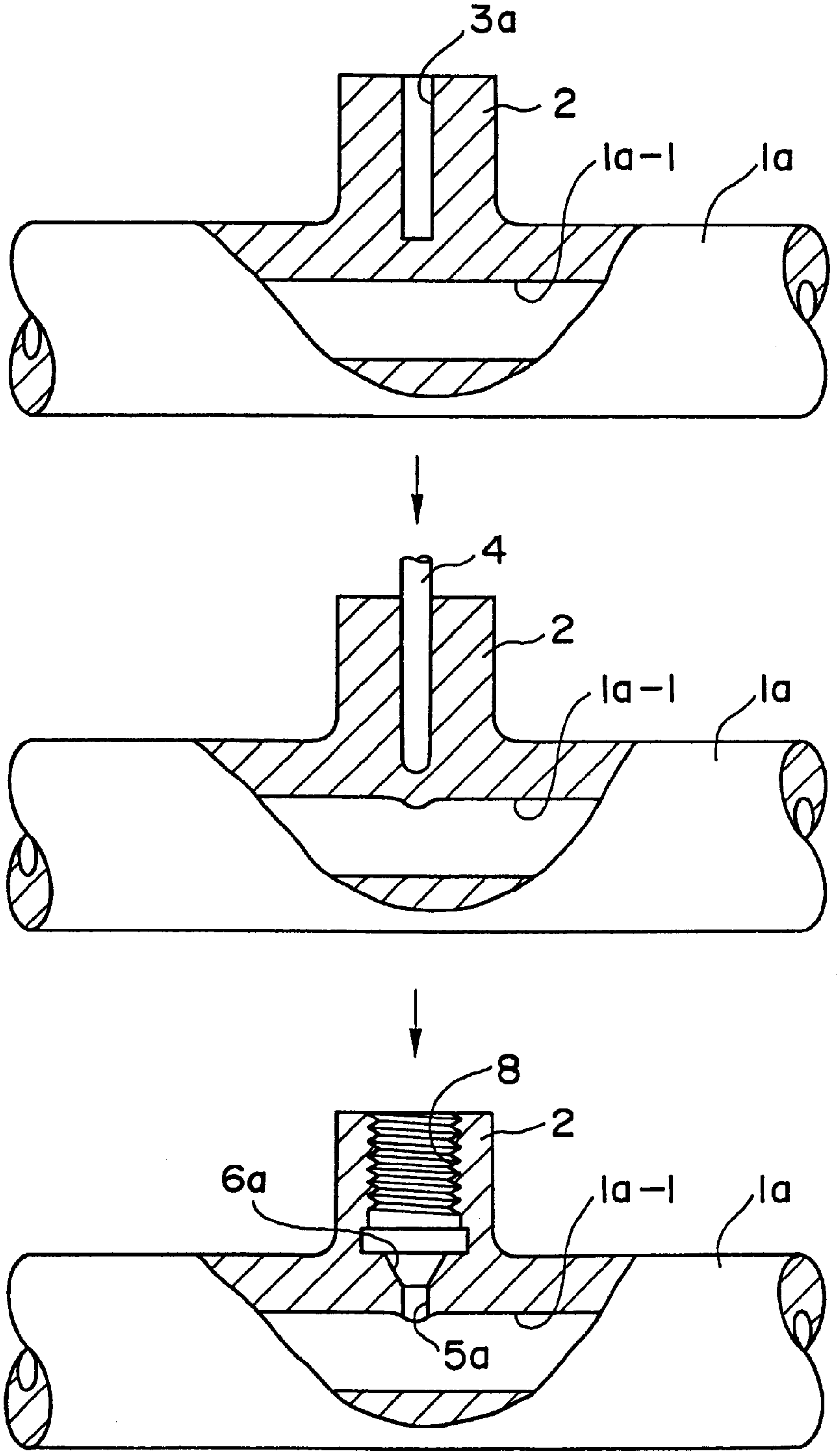
FIG. 2 is a partially cutoff schematic diagram showing another embodiment of the method of manufacturing a common rail having a boss integral with a main tubular rail according to the present invention.

FIG. 2 illustrates a method of manufacturing an internal thread type common rail. In this method, a bottomed lower hole 3*a* with a diameter substantially equal to the diameter of a branch hole 5*a* that will be formed later, and with a suitable depth is formed in a boss 2 of a main tubular rail 1*a*. The hole 3*a* is formed by boring the boss, for example, by an end mill, in the same manner as in the case of the manufacture of the common rail of FIG. 1. On a subsequent pressing stage, the main tubular rail 1*a* is fixed in a mold (not shown), and a pressing force is applied to an inner bottom portion of the boss by a punch 4 having a diameter which permits the punch 4 to be inserted into the bottomed lower hole 3*a* in the boss 2. Thus, residual compressive stress is generated in a circumferential part of the end portion of the branch hole 5*a* which is opened into the flow passage in the main tubular rail 1*a*. The branch hole 5*a* communicates with the flow passage 1*a*-1 in the main tubular rail 1*a* and a pressure receiving surface 6*a* formed of a circular and outwardly opened circumferential surface that communicates with the flow passage 1*a*-1 is then provided in the boss 2. An internal thread 8 is formed in an inner circumferential surface of the bottomed lower hole 3*a* in the boss. Therefore, in the case of this method of manufacturing common rails, a fine defect occurring in the bottom portion of the bottomed lower hole 3*a* is cut off by a cutting process applied to the pressure receiving surface 6*a*. The internal thread 8 may also be formed earlier on a pre-processing stage.

Figure 3:
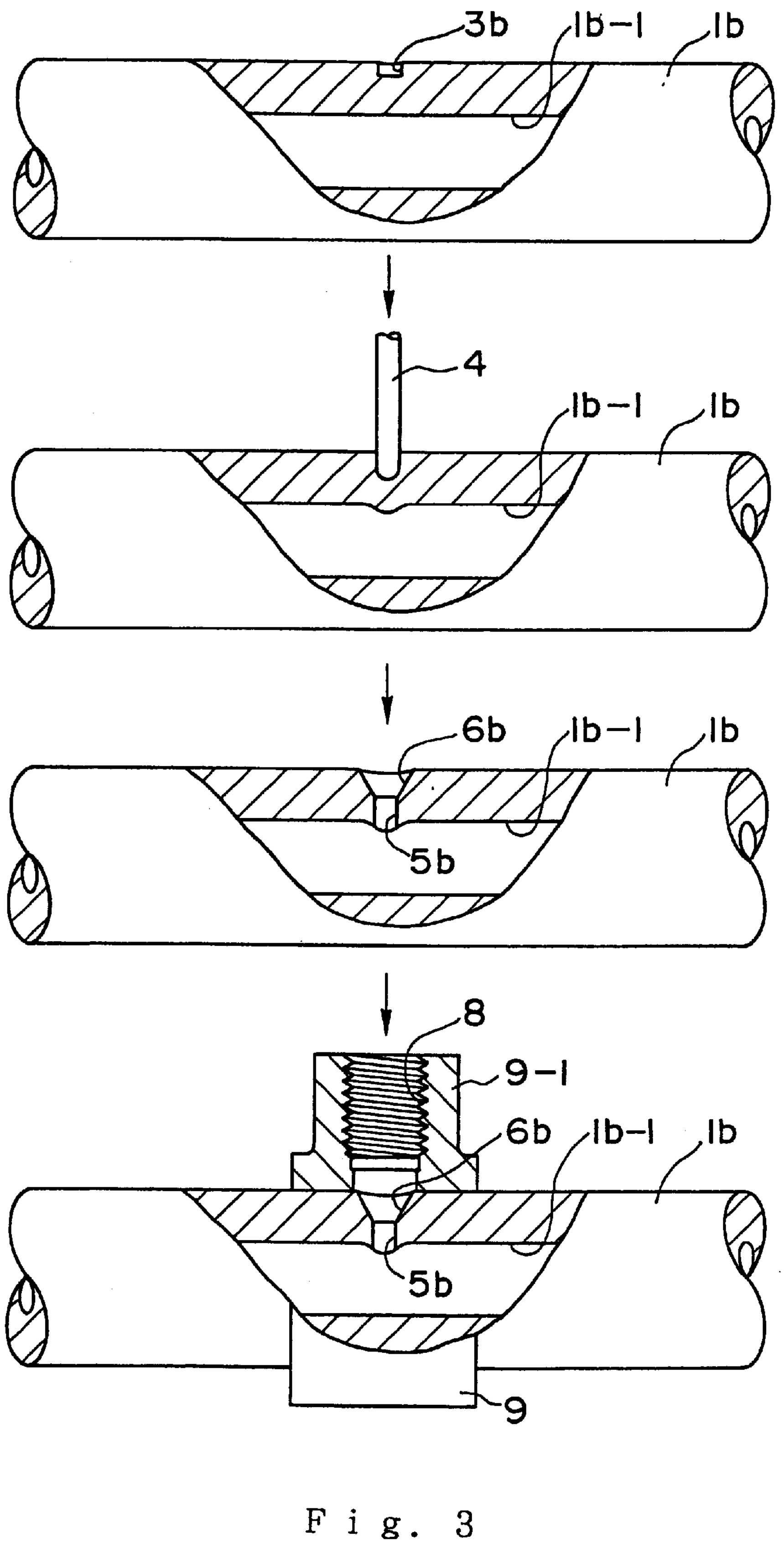
FIG. 3 is a partially cutoff schematic diagram showing an embodiment of the method of manufacturing a common rail using a ring-shaped metal joint.

FIG. 3 illustrates a method of manufacturing common rails, using a ring-shaped metal joint. In the method, a bottomed lower hole 3*b* with a diameter substantially equal to that of a branch hole 5*b*, which is to be formed later, and with a suitable depth is provided in a main tubular rail 1*b*. The hole 3*b* is formed with a ring-shaped metal joint (retainer) 9 removed. The retainer 9 is provided in its inner circumferential surface with a threaded wall 9-1 to be screwed on a tightening nut to be fitted around a branch pipe. Then, on a pressing stage, a pressing force is applied to an inner bottom portion of the bottomed lower hole 3*b* by a punch 4 having a diameter which permits the punch 4 to be fitted in the bottomed lower hole 3*b*. Thus residual compressive stress is generated in a circumferential part of the end portion of the branch hole 5*b* which is opened into the flow passage 1*b*-1 in the main tubular rail 1*b*. A pressure receiving surface 6*b* then is formed in the bottomed lower hole 3*b* to define a circumferential surface communicating with this flow passage 1*b*-1 and having a circular outwardly opened circumferential surface communicating with the same flow passage. The ring-shaped metal joint 9 then is fixed to the main tubular rail 1*b*. In this method of manufacturing common rails, a fine defect is removed by cutting the bottomed lower hole 3*b* so as to form the circular and outwardly opened pressure receiving surface 6*b* therein.

Figure 4:
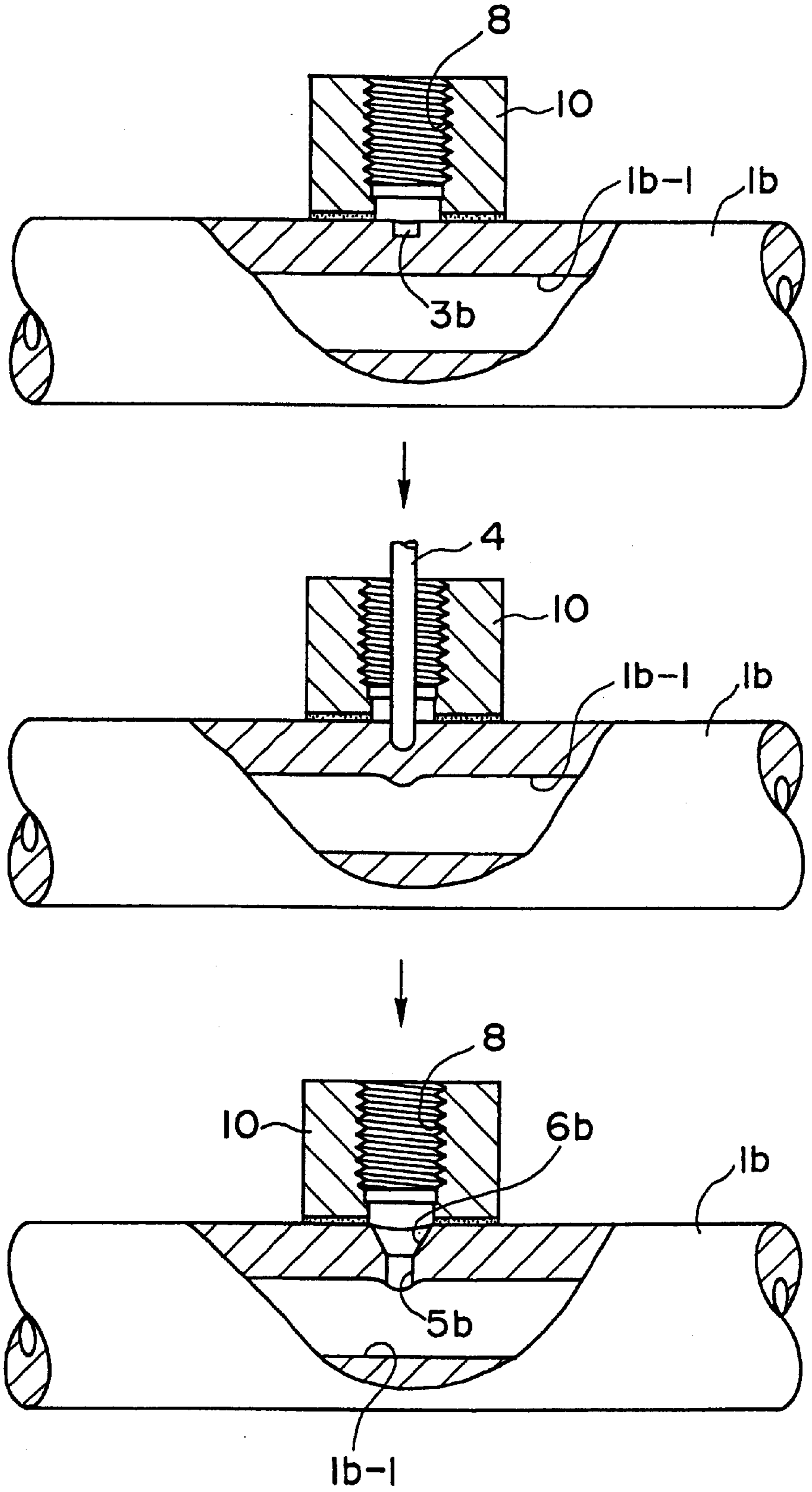
FIG. 4 is a partially cutoff schematic diagram showing an embodiment of the method of manufacturing a common rail using a sleeve.

FIG. 4 illustrates a method of manufacturing common rails, using a sleeve. The method includes a step of fixing a base end of a cylindrical sleeve 10 as a metal joint, which is provided therein with an internal thread 8 engaged with a tightening nut inserted into a branch pipe, to an outer circumferential wall of a main tubular rail 1*b* by direct soldering. The method also includes providing a bottomed lower hole 3*b* having a diameter substantially equal to the diameter of a branch hole 5*b* to be formed later, and having a suitable depth. The bottomed lower hole 3*b* is provided in a central part of the portion of an outer circumferential surface of the main tubular rail 1*b* which is surrounded by this cylindrical sleeve 10. The method further includes generating residual compressive stress in a circumferential part of the end portion of the branch hole 5*b* which is opened into the flow passage in the main tubular rail 1*b*, by applying a pressing force to an inner bottom portion of the bottomed lower hole 3*b*. The pressing force is applied by a punch 4 having a diameter which permits the punch to be fitted into the bottomed lower hole 3*b*. The method proceeds by forming in the bottomed lower hole 3*b* the branch hole 5*b* which communicates with the flow passage 1*b*-1 in the main tubular rail 1*b*, and which has a pressure receiving surface 6*b* formed on a circular outwardly opened circumferential surface communicating with the same flow passage. In this method of manufacturing common rails, a fine defect in the bottomed lower hole 3*b* is removed as well in the same manner as in the method shown in FIG. 3, by forming the circular outwardly opened pressure receiving surface 6*b* in the bottomed lower hole 3*b* by cutting the same.

Figure 5:
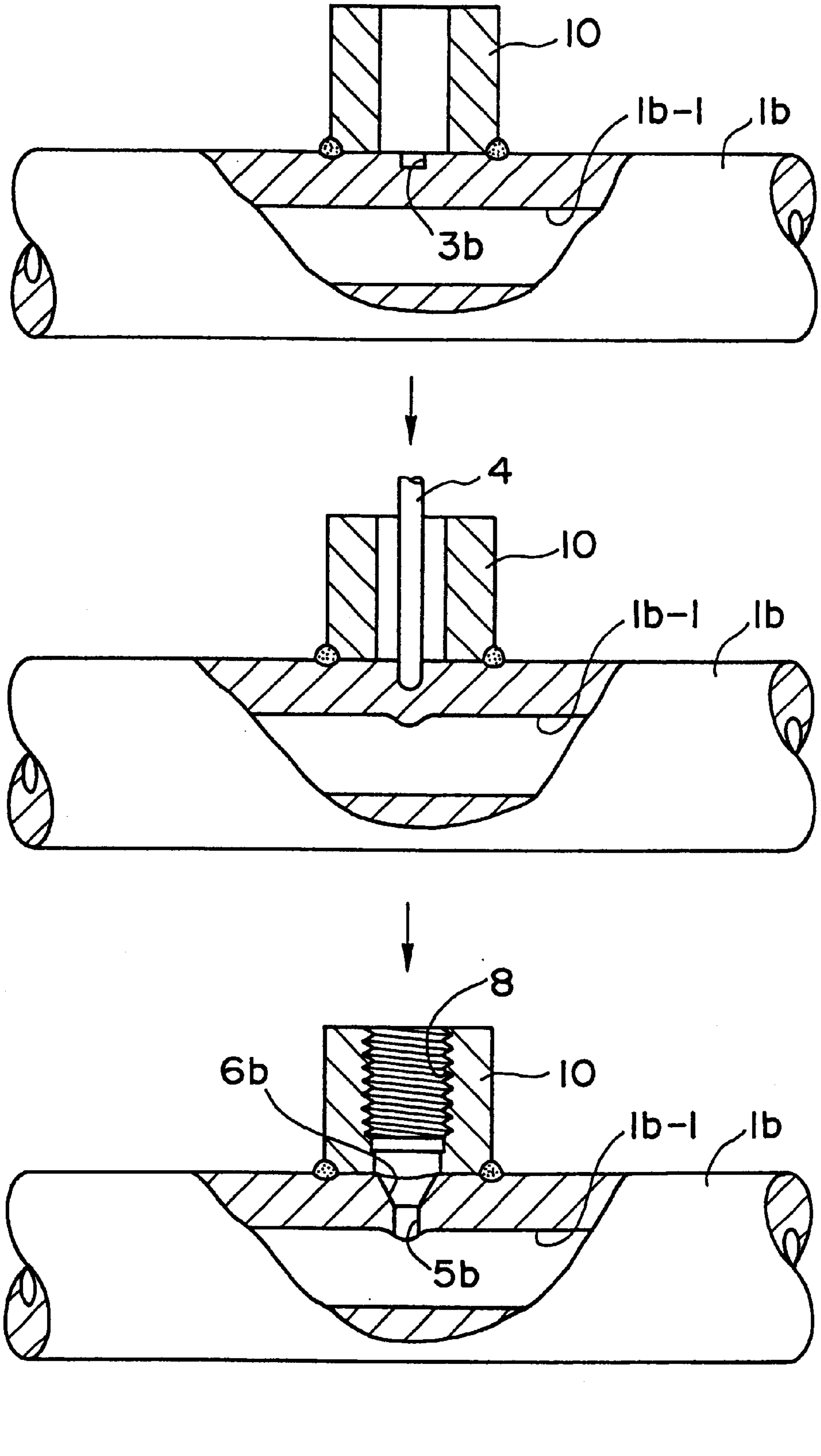
FIG. 5 is a partially cutoff schematic diagram showing another embodiment of the method of manufacturing a common rail using a sleeve.

FIG. 5 illustrates a method of manufacturing common rails, using a sleeve, and is an example of a method of fixing the same cylindrical sleeve, shown in FIG. 4, to a main tubular rail 1*b* by welding. The method of FIG. 5 includes a step of fixing a base end portion of the cylindrical sleeve 10 as a metal joint to an outer circumferential wall of the main tubular rail lb by welding the sleeve 10 directly to the main tubular rail 1*b*. The method also includes providing a bottomed lower hole 3*b*, which has a diameter substantially equal to that of a branch hole 5*b* to be formed later and having a suitable depth. The bottomed lower hole 5*b* is provided in a central part of the portion of the outer circumferential surface of the main tubular rail 1*b* which is surrounded by the cylindrical sleeve 10. The method further includes generating residual compressive stress in a circumferential part of the lower end portion of the branch hole 5*b* which is opened into the flow passage in the main tubular rail, by applying a pressing force to an inner bottom portion of the bottomed lower hole 3*b* by a punch 4. The punch 4 has a diameter which permits the punch to be fitted in the bottomed lower hole 3*b*. The method then includes forming the branch hole 5*b* which communicates with the flow passage 1*b*-1 in the main tubular rail 1*b*, and which has a pressure receiving surface 6*b* formed on a circular outwardly opened circumferential surface communicating with the same flow passage. The method provides, in an inner circumferential surface of the sleeve 10, an internal thread 8 which is engaged with a tightening nut fitted around the branch pipe. Therefore, in this method of manufacturing sleeve-welded type common rails, a defect occurring in the bottomed lower hole 3*b* is removed by forming the circular outwardly opened pressure receiving surface 6*b* on the bottomed lower surface 3*b* by a cutting process in the same manner as in the method shown in FIG. 4.

Although all of the common rails in the embodiments shown in FIGS. 1 to 5 have a structure in which the axis of the flow passage in the main tubular rail and that of the branch hole cross each other at one point, the present invention can also be applied to a common rail in which the axis of a branch pipe is shifted in the radial direction of the main tubular rail.

Figure 6:
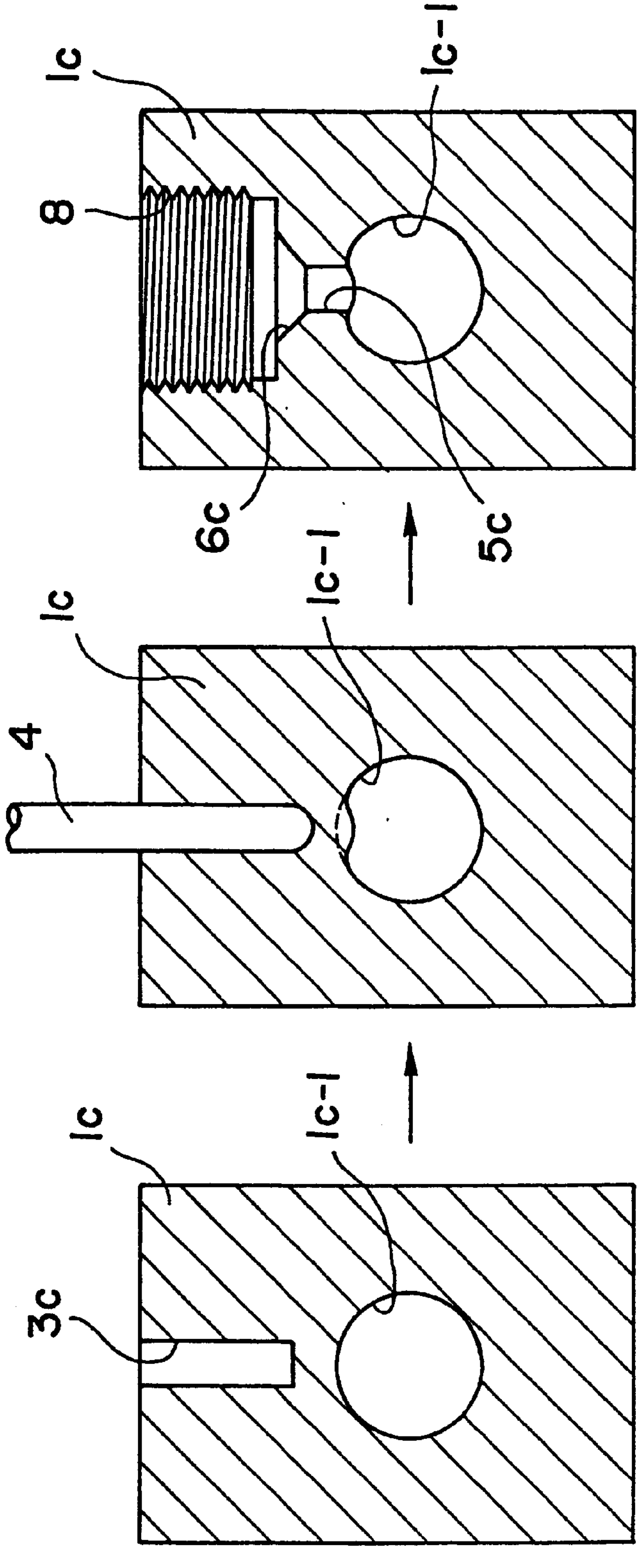
FIG. 6 is a sectional view showing an embodiment in which the present invention is applied to a method of manufacturing a block rail.
Figure 7:
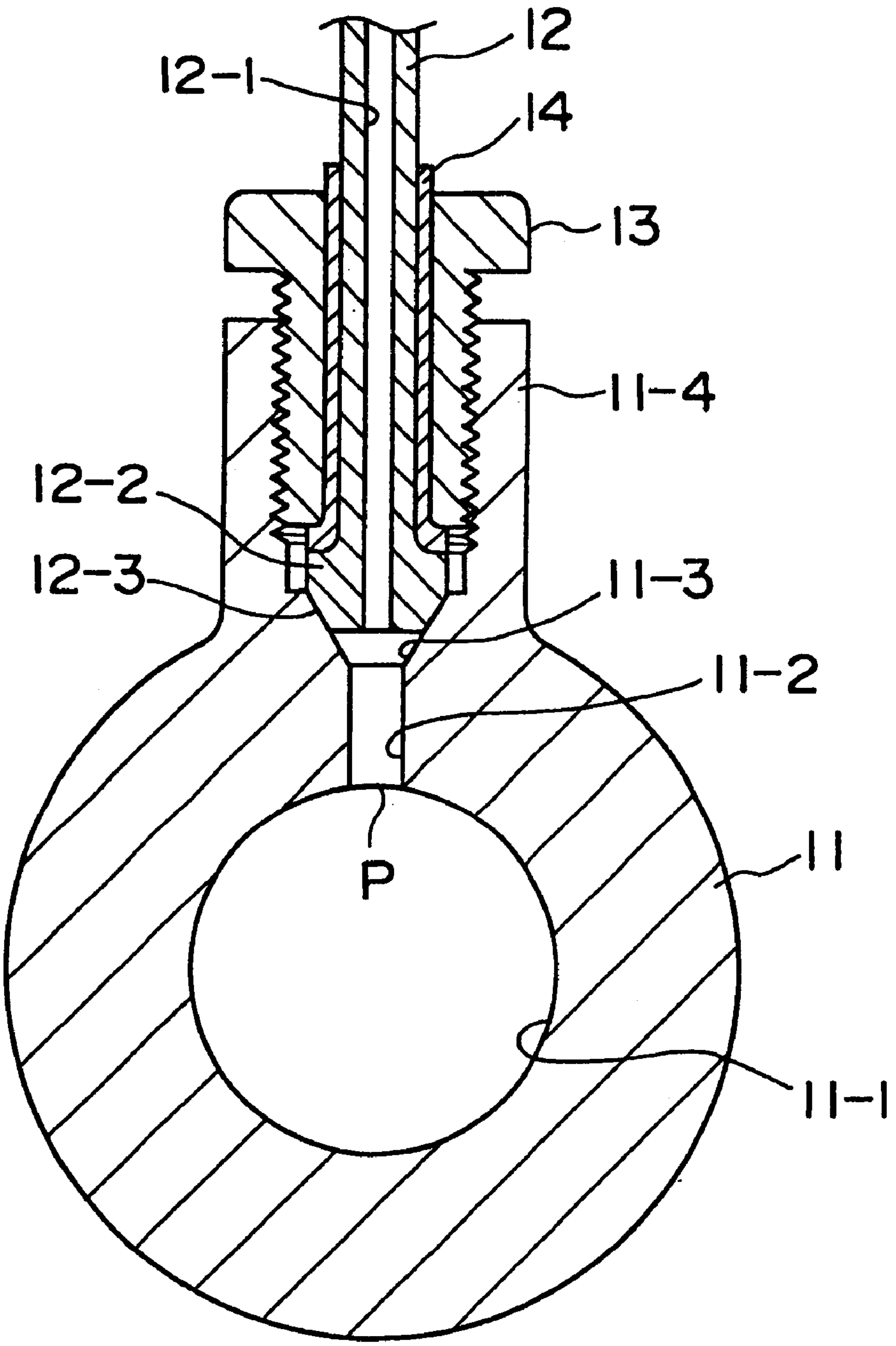
FIG. 7 is a longitudinal sectional view showing an example of a branch pipe connecting structure in a common rail of the related art to which the present invention is directed.
Figure 8:
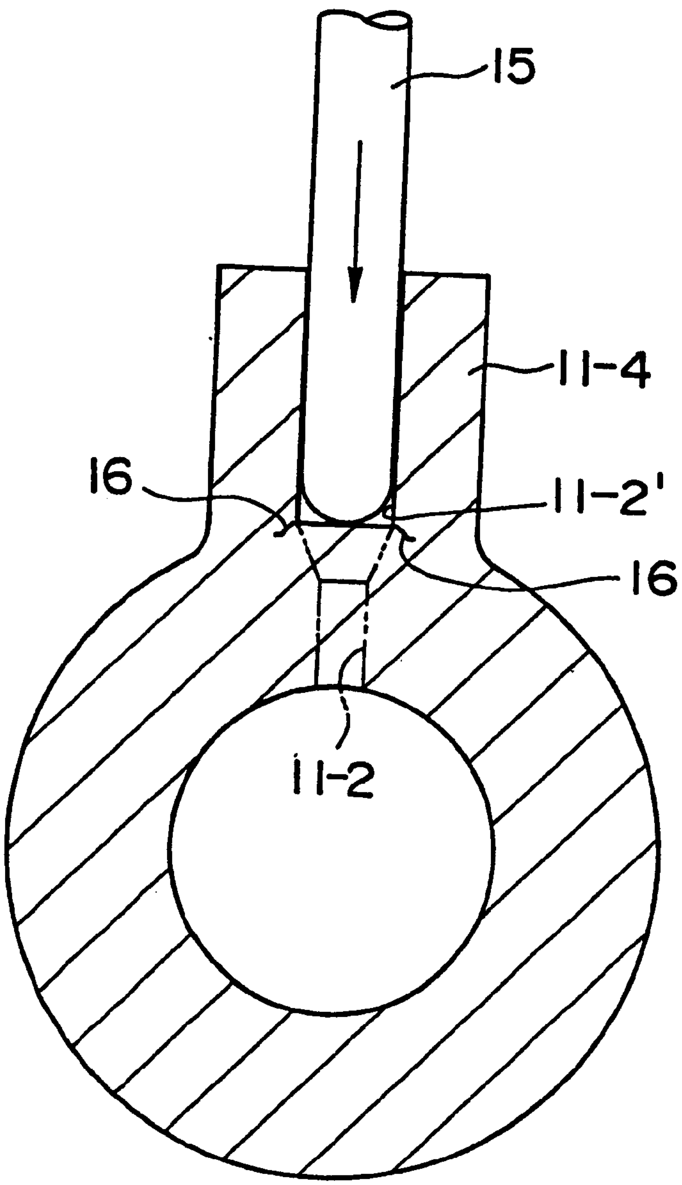
FIG. 8 is a longitudinal sectional view showing an example of a method of the related art of generating and leaving residual compressive stress in a circumferential part of the end portion of a branch hole in a common rail which is opened into a flow passage in a main tubular rail.
Figure 9:
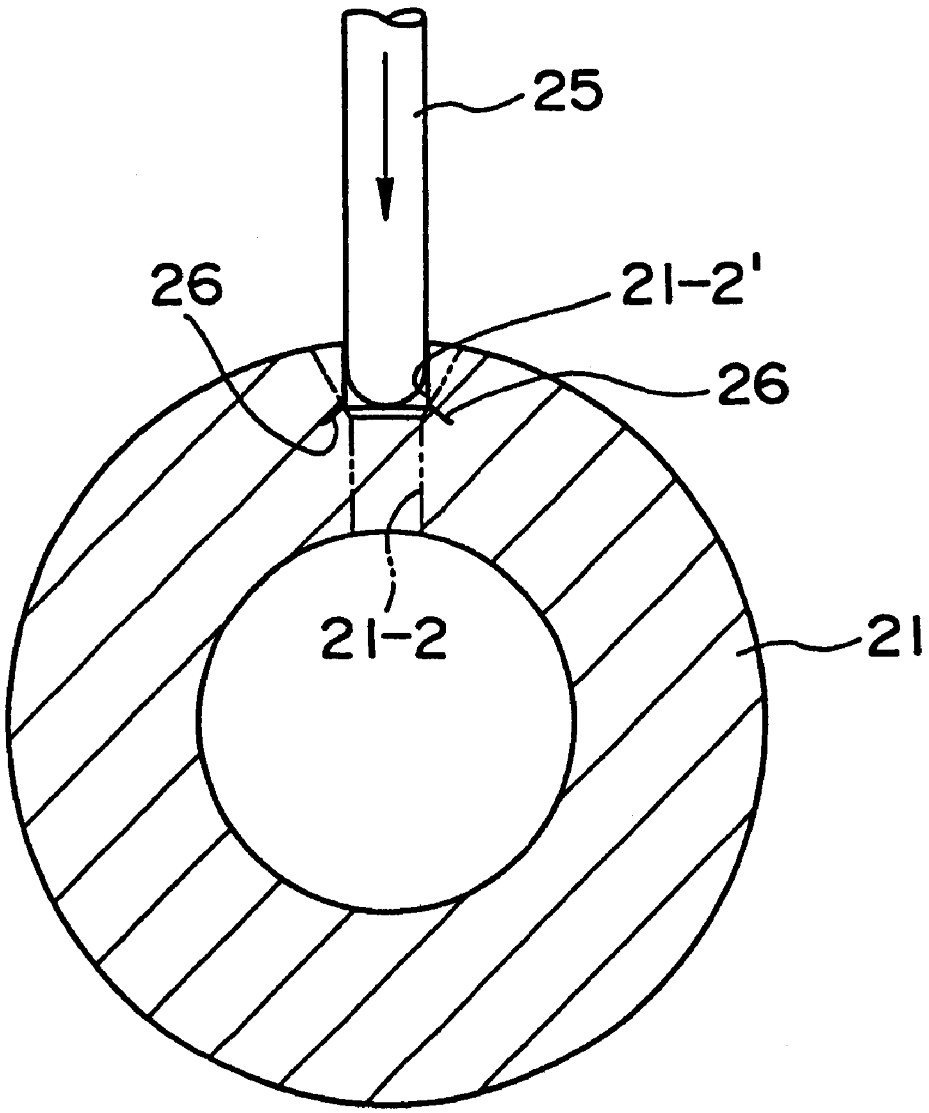
FIG. 9 is a longitudinal sectional view showing another example of a method of the related art of generating and leaving residual compressive stress in a circumferential part of the end portion of a branch hole in a common rail which is opened into a flow passage in a main tubular rail.

In the case of a block rail, a bottomed hole 3*c* of a suitable depth is formed first in the block rail 1*c* on a pre-processing stage (cutting stage) by cutting the same with, for example, an end mill, as shown in FIG. 6. Then, on a pressing stage, the block rail 1*c* is fixed in a mold (not shown), and a pressing force is applied to an inner bottom portion of a boss by a punch 4 which has a diameter slightly smaller than an inner diameter of the bottomed lower hole 3*c*, and which is fixed to a press. Although the level of this pressing force is not specially limited, it may be substantially so high that it makes the portion of an inner circumferential surface of a flow passage 1*c*-1 in the block which is just under the bottomed lower hole 3*c* project slightly. Owing to the pressing force of this punch 4, the inner circumferential surface of the flow passage 1*c*-1 of the block rail projects slightly, and a plastically deformed portion and an elastically deformed portion occur when the pressing force is applied to the inner bottom portion of the boss. Residual compressive stress occurs due to deformation ascribed to a difference in the quantities of return at the time of removal of the pressing force.

After the pressing force is applied to the inner bottom portion of the boss by the punch 4, a fine defect is removed by: forming the bottomed lower hole 3*c* in a joint hole of a larger diameter; cutting the former hole with, for example, a drill having a diameter larger than an inner diameter of the bottom lower hole 3*c*, and a branch hole 5*c* communicating with the flow passage 1*c*-1; and having a pressure receiving surface 6*c* formed on a circular outwardly opened circumferential surface communicating with the same flow passage is formed. An internal thread 8 is formed in an inner circumferential surface of the joint hole. The internal thread 8 may also be formed in advance on a pre-processing stage.

According to the present invention described above, it becomes possible to minimize effectively the occurrence of stress in an inner circumferential part P of a lower end of the branch hole while a high-pressure fuel is accumulated in the flow passage during the use of the common rail. Stress is minimized by making residual compressive stress exist in the circumferential part of the end portion of the branch hole which is opened into the flow passage in the main tubular rail or a block rail. The method obtains a normal branch hole, which does not have a fine defect, such as a fine crack in its inner circumferential surface, by cutting off the fine defect which has occurred due to the exertion of the residual compressive stress. The method improves the internal pressure fatigue strength of a branch-connected portion of the common rail. Therefore, the common rail obtained has a high durability, prevents the leakage of a fluid ascribed to the occurrence of a crack and a split, and can fulfill a reliable and stable function thereof.

What is claimed is:

1. A method of manufacturing common rails, having the steps of forming at least one boss made integral with an axially extending circumferential wall of a main tubular rail having a flow passage in an axially extending inner portion thereof, forming a branch hole in the at least one boss, such that the branch hole communicates with the flow passage, and such that the branch hole has an outwardly opened pressure receiving seat surface for engaging a pressure seat surface on a joint head at an end portion of a branch pipe, the branch pipe having a flow passage for communicating with the flow passage in the main tubular rail, a tightening nut being fitted around the branch pipe in advance for fastening and joining the branch pipe to the main tubular rail by a pressure occurring due to a screwing force exerted on a bent surface of a neck portion of the joint head, wherein, before the step of forming the branch hole the method comprises the steps of:

forming a bottomed lower hole in the at least one boss;

generating residual compressive stress in a circumferential part of the bottomed lower hole adjacent the flow passage in the main tubular rail by applying a pressing force from outside to the bottomed lower hole in an axial direction of the boss by an external pressure system; and then cutting off a fine defect occurring in the lower hole.

2. A method of manufacturing common rails according to claim 1, wherein the main tubular rail is selected from the group consisting of a forged product and a stretched tubular member having a thick-walled tubular portion.

3. A method of manufacturing common rails according to claim 2, wherein the main tubular rail has a machined flow passage in an axial inner portion thereof.

4. A method of manufacturing common rails according to claim 2, wherein the bottomed lower hole is formed by boring with an end mill, a pressing force being then applied to the bottomed lower hole by a punch of a press, the bottomed lower hole being thereafter cut off by a drill.

5. A method of manufacturing common rails, having the steps of forming at least one branch hole in an axially extending circumferential wall of a main tubular rail having a flow passage in an axially extending inner portion thereof; forming on an inner circumferential surface of the branch hole an outwardly opened pressure receiving seat surface to which a branch pipe having a flow passage communicating with the flow passage in the main tubular rail is joined; engaging a pressure seat surface, which is formed on a joint head on an end portion of the branch pipe, with the pressure receiving seat surface; and screwing on each other a separately formed metal joint fixed to the main tubular rail and a tightening nut fitted around the branch pipe in advance, to thereby fasten and join the branch pipe to the main tubular rail by a pressure occurring due to screwing force exerted on a bent surface of a neck portion of the joint head, wherein, before the step of forming the branch hole, the method comprises the steps of:

forming a bottomed lower hole in advance in a portion of the main tubular rail that will subsequently define the branch hole, generating residual compressive stress in a circumferential part of an end portion of the bottomed lower hole substantially adjacent the flow passage of the main tubular rail by applying a pressing force from the outside to the bottomed lower hole in an axial direction thereof by an external pressure system, and then cutting off a fine defect occurring in the bottomed lower hole.

6. A method of manufacturing common rails according to claim 5, wherein the main tubular rail is selected from the group consisting of a forged product and a stretched tubular member having a thick-walled tubular portion.

7. A method of manufacturing common rails according to claim 6, wherein the main tubular rail has a machined flow passage in an axial inner portion thereof.

8. A method of manufacturing common rails according to claim 6, wherein the bottomed lower hole is formed boring with an end mill, a pressing force being then applied to the bottomed lower hole by a punch of a press, the bottomed lower hole being thereafter cut off by a drill.

9. A method of manufacturing common rails, having the steps of forming at least one joint hollow in an axially extending circumferential wall of a block rail having a flow passage in an axially extending inner portion thereof, forming in the at least one joint hollow a branch hole communicating with the flow passage and having a pressure receiving seat surface, forming a pressure seat surface on a joint head provided at an end portion of a branch pipe having therein a flow passage for communicating with the flow passage in the block rail, engaging the pressure seat surface with the pressure receiving seat surface, screwing a tightening nut, which is fitted around the branch pipe in advance, into the joint hollow, and fastening and joining the branch pipe to the block rail by a pressure occurring due to screwing force exerted on a bent surface of a neck portion of the joint head, wherein, before the step of forming the branch hole, the method comprises the steps of:

forming a bottomed lower hole in the portion of the block rail which will define the branch hole;

generating residual compressive stress in a circumferential part of the bottomed lower hole substantially adjacent the flow passage in the block rail by applying a pressing force from the outside to the bottomed lower hole in the axial direction thereof by an external pressure system, and then cutting off a fine defect occurring in the bottomed lower hole.

10. A method of manufacturing common rails according to claim 9, wherein the block rail comprises a forged product having a thick-walled tubular portion.

11. A method of manufacturing common rails according to claim 10, wherein the block rail has a machined flow passage in axial inner portion thereof.

12. A method of manufacturing common rails according to claim 10, wherein the bottomed lower hole is formed by boring by an end mill, a pressing force being then applied to the lower hole by a punch of a press, the lower hole being thereafter cut off by a drill.

13. A method of manufacturing common rails according to claim 1, wherein the main tubular rail has a machined flow passage in an axial inner portion thereof.

14. A method of manufacturing common rails according to claim 1, wherein the bottomed lower hole is formed by boring by an end mill, a pressing force being then applied to the lower hole by a punch of a press, the lower hole being thereafter cut off by a drill.

15. A method of manufacturing common rails according to claim 5, wherein the main tubular rail has a machined flow passage in an axial inner portion thereof.

16. A method of manufacturing common rails according to claim 5, wherein the bottomed lower hole is formed by boring with an end mill, a pressing force being then applied to the lower hole by a punch of a press, the lower hole being thereafter cut off by a drill.

17. A method of manufacturing common rails according to claim 9, wherein the block rail has a machined flow passage in an axial inner portion thereof.

18. A method of manufacturing common rails according to claim 9, where in the bottomed lower hole is formed by boring with an end mill, a pressing force being then applied to the lower hole by a punch of a press, the lower hole being thereafter cut off by a drill.

19. A method of manufacturing common rails for a fluid system, said method comprising:

providing a main rail having a peripheral wall and an axial flow passage extending through the peripheral wall and having an outer peripheral surface formed on the peripheral wall and spaced from the axial flow passage;

forming in the peripheral wall a lower hole aligned substantially transverse to the axial flow passage and extending from the outer peripheral surface to a bottom at a location in the peripheral wall spaced from the axial flow passage;

applying a pressing force to the bottom of the lower hole, the pressing force being of a sufficient magnitude to generate a residual compressive stress in the peripheral wall at location substantially adjacent and between the bottom of the lower hole and the axial flow passage; and boring the peripheral wall at locations substantially concentric with lower hole for forming the lower hole into a branch hole that communicates with the axial flow passage and for removing defects in the peripheral wall caused by the step of applying a pressing force, whereby the residual compressive stress and the removal of defect enhances durability of the common rail.

* * * * *